(12) United States Patent
Brown et al.

(10) Patent No.: US 11,543,030 B2
(45) Date of Patent: *Jan. 3, 2023

(54) GASKET WITH ELECTRICAL ISOLATING COATINGS

(71) Applicant: Garlock Pipeline Technologies, Inc., Wheat Ridge, CO (US)

(72) Inventors: Ian Brown, Denver, CO (US); Ryan Buttimer, Golden, CO (US); T. Scott Tanner, Rochester, NY (US); Christopher Remley, Wheat Ridge, CO (US)

(73) Assignee: Garlock Pipeline Technologies, Inc., Wheat Ridge, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/234,013

(22) Filed: Apr. 19, 2021

(65) Prior Publication Data

US 2021/0310559 A1  Oct. 7, 2021

Related U.S. Application Data

(63) Continuation of application No. 15/996,975, filed on Jun. 4, 2018, now Pat. No. 11,015,710, which is a
(Continued)

(51) Int. Cl.
*F16J 15/06* (2006.01)
*F16L 25/02* (2006.01)
(Continued)

(52) U.S. Cl.
CPC ............ *F16J 15/064* (2013.01); *F16L 23/18* (2013.01); *F16L 25/026* (2013.01); *F16J 15/122* (2013.01);
(Continued)

(58) Field of Classification Search
CPC .. F16J 15/064; F16J 15/122; F16J 2015/0856; F16L 23/18; F16L 25/026
See application file for complete search history.

(56) References Cited

U.S. PATENT DOCUMENTS 3,019,281 A  1/1962  Lee
3,561,793 A  2/1971  Rode
(Continued)

FOREIGN PATENT DOCUMENTS

BR   PI0701731 A2  1/2009
CA   1120339 A     3/1982
(Continued)

OTHER PUBLICATIONS

International Search Report and Written Opinion for PCT Application No. PCT/US2009/038655, dated May 8, 2009, 9 pages.
(Continued)

*Primary Examiner* — Nicholas L Foster

(74) *Attorney, Agent, or Firm* — Perkins Coie LLP

(57) ABSTRACT

An electrically isolating gasket is disclosed wherein a coating layer is disposed on at least one conductive surface, and in some embodiments, on all surfaces or at least all of the conductive surfaces. The electrically isolating gasket includes a core gasket component, a ring seal component, and a non-conductive inner seal component. The coating layer can be, for example, polyimide, polyamide, ceramic, and aluminum oxide.

19 Claims, 5 Drawing Sheets

Related U.S. Application Data continuation-in-part of application No. 29/640,610, filed on Mar. 15, 2018, now Pat. No. Des. 886,253, which is a continuation-in-part of application No. 15/726,080, filed on Oct. 5, 2017, now abandoned.

(60) Provisional application No. 62/404,673, filed on Oct. 5, 2016.

(51) Int. Cl.
    *F16L 23/18* (2006.01)
    *F16J 15/08* (2006.01)
    *F16J 15/12* (2006.01)
    *F16L 17/025* (2006.01)

(52) U.S. Cl.
    CPC ...... *F16J 2015/0856* (2013.01); *F16L 17/025* (2013.01)

(56) References Cited

U.S. PATENT DOCUMENTS

| | | |
|---|---|---|
| 3,595,588 A | 7/1971 | Rode |
| 3,720,420 A | 3/1973 | Jelinek et al. |
| 3,869,132 A | 3/1975 | Taylor et al. |
| 3,871,668 A | 3/1975 | Coker et al. |
| 4,019,371 A | 4/1977 | Chaplin et al. |
| 4,406,467 A | 9/1983 | Burger et al. |
| 4,690,438 A | 9/1987 | Kanczarek |
| 4,776,600 A | 10/1988 | Kohn |
| 5,316,320 A | 5/1994 | Breaker |
| 5,427,386 A | 6/1995 | Breaker |
| 5,518,257 A | 5/1996 | Breaker |
| 5,551,703 A | 9/1996 | Morvant |
| 5,564,715 A | 10/1996 | Wallace |
| 5,758,882 A | 6/1998 | Torzewski |
| 5,938,246 A | 8/1999 | Wallace et al. |
| 5,984,316 A | 11/1999 | Balsells |
| 6,019,621 A | 2/2000 | Sugata et al. |
| 6,091,175 A | 7/2000 | Kinsinger |
| 6,173,969 B1 | 1/2001 | Stoll et al. |
| 6,322,087 B1 | 11/2001 | Swensen et al. |
| 6,402,159 B1 | 6/2002 | Kohn |
| 6,419,237 B1 | 7/2002 | More |
| 6,547,255 B1 | 4/2003 | Donaway et al. |
| 6,695,357 B2 | 2/2004 | Schenk et al. |
| 6,814,358 B2 | 11/2004 | Keck |
| 7,121,557 B2 | 10/2006 | Christie et al. |
| 7,350,833 B2 | 4/2008 | Bongiomo |
| 7,513,925 B2 | 4/2009 | Thomas et al. |
| 7,624,991 B2 | 12/2009 | Putch |
| 7,703,773 B2 | 4/2010 | Putch |
| 8,181,970 B2 | 5/2012 | Smith |
| 8,596,692 B1 | 12/2013 | Gourlay |
| 8,678,398 B2 | 3/2014 | Anderson et al. |
| 8,876,118 B2 | 11/2014 | Hoyes et al. |
| 9,388,924 B2 | 7/2016 | Stubblefield et al. |
| 9,726,292 B2 | 8/2017 | Stirnemann et al. |
| 9,890,859 B2 | 2/2018 | Veiga et al. |
| 10,001,235 B2 | 6/2018 | Bander et al. |
| 10,117,366 B2 | 10/2018 | Dilmaghanian et al. |
| 10,145,498 B2 | 12/2018 | Shimizu |
| 11,015,710 B2 | 5/2021 | Brown et al. |
| 11,060,612 B2 * | 7/2021 | Lee ............. F16J 15/064 |
| 2002/0030326 A1 | 3/2002 | Bettencourt |
| 2003/0132579 A1 | 7/2003 | Hoyes et al. |
| 2004/0256129 A1 | 12/2004 | Matsumoto et al. |
| 2005/0194750 A1 | 9/2005 | Wallace |
| 2006/0220324 A1 | 10/2006 | Anderson et al. |
| 2007/0024007 A1 | 2/2007 | Putch |
| 2007/0216111 A1 | 9/2007 | Matsui |
| 2008/0029971 A1 | 2/2008 | Putch |
| 2008/0111313 A1 | 5/2008 | Putch |
| 2009/0243290 A1 * | 10/2009 | Anderson ............. F16L 25/026 285/329 |
| 2010/0127461 A1 | 5/2010 | Putch |
| 2011/0140371 A1 | 6/2011 | Strydom |
| 2011/0266755 A1 * | 11/2011 | Anderson ............. F16L 25/026 277/611 |
| 2012/0235365 A1 | 9/2012 | Stubblefield et al. |
| 2013/0186503 A1 | 7/2013 | Royer |
| 2013/0328270 A1 | 12/2013 | Stubblefield et al. |
| 2015/0276105 A1 | 10/2015 | Bander et al. |
| 2015/0377394 A1 | 12/2015 | Kramer |
| 2016/0102793 A1 | 4/2016 | Shimizu |
| 2017/0009918 A1 | 1/2017 | Koves |
| 2017/0074437 A1 | 3/2017 | Briggs |
| 2017/0152973 A1 | 6/2017 | Kolb |
| 2018/0058616 A1 | 3/2018 | Rowley et al. |
| 2018/0094756 A1 | 4/2018 | Brown et al. |
| 2018/0266595 A1 | 9/2018 | Bander et al. |
| 2018/0299044 A1 * | 10/2018 | Brown ............. F16J 15/0818 |
| 2021/0003218 A1 * | 1/2021 | Lee ............. F16J 15/122 |

FOREIGN PATENT DOCUMENTS

| | | |
|---|---|---|
| CA | 2320647 A1 | 4/2001 |
| CA | 2953900 A1 | 1/2016 |
| CN | 102027280 A | 4/2011 |
| CN | 201818935 U | 5/2011 |
| EP | 0081652 A1 | 6/1983 |
| JP | 5248542 A | 9/1993 |
| JP | 3431460 B2 | 7/2003 |
| JP | 2004308761 A | 11/2004 |
| JP | 2006037756 A | 2/2006 |
| KR | 100496804 B1 | 6/2005 |
| KR | 101559540 B1 | 10/2015 |
| KR | 20170034793 A | 3/2017 |
| WO | 9409295 A1 | 4/1994 |
| WO | 2006107798 A1 | 10/2006 |
| WO | 2016003444 A1 | 1/2016 |
| WO | 2016171704 A1 | 10/2016 |

OTHER PUBLICATIONS

EPO, Extended European Search Report for Application No. 18865330.7 dated May 26, 2021, 8 pages.

Korean Application No. 10-2017-7033272, Search Report dated Mar. 22, 2018, 9 pages.

* cited by examiner

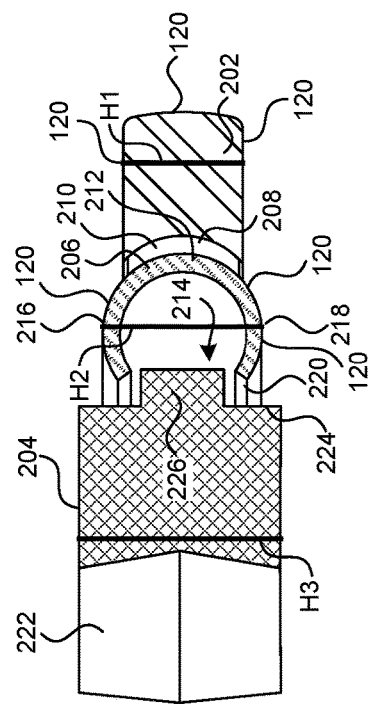
FIG. 3C
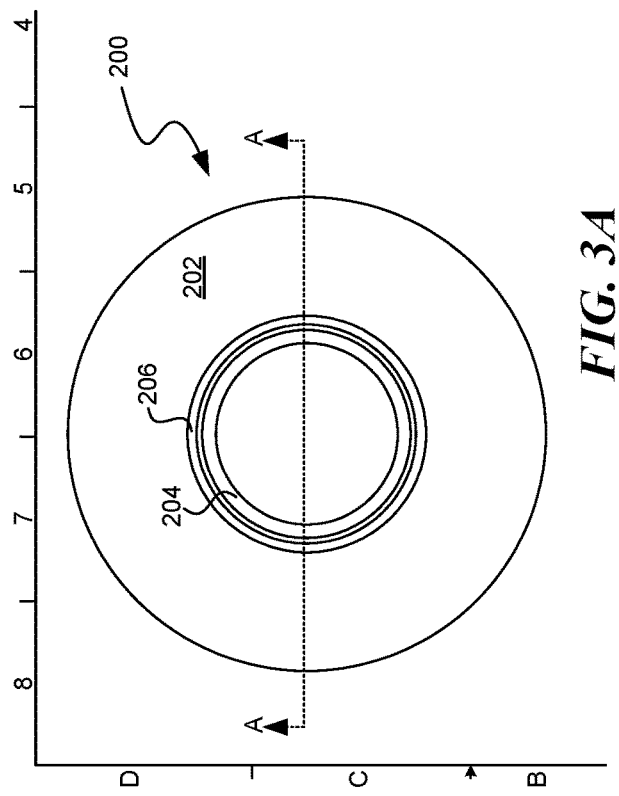
FIG. 3A
FIG. 3B

GASKET WITH ELECTRICAL ISOLATING COATINGS

The present application is a continuation of U.S. patent application Ser. No. 15/996,975, filed Jun. 4, 2018, which is a continuation in part of U.S. patent application Ser. No. 15/726,080, filed Oct. 5, 2017, through which it claims priority to U.S. Provisional Patent Application No. 62/404,673, filed Oct. 5, 2016, both of which are hereby incorporated by reference as if set out in full. The present application is also a continuation in part of U.S. patent application Ser. No. 29/640,610, filed Mar. 15, 2018, the disclosure of which is incorporated herein by reference as if set out in full.

BACKGROUND

Providing gaskets with electrically isolating properties is desired in a variety of different industries and applications. However, many limitations exist with respect to previously known gaskets having electrical isolating properties.

For example, in some cases, the electrical isolation properties of these gaskets are not high enough for a given application or industry. This may be because the material used to provide electrically isolating properties is not a high dielectric material.

In some instances, gaskets with electrically isolating properties are limited to lower temperature applications because they are not capable of withstanding exposure to high temperatures. In one example, gaskets with electrical isolating properties use glass reinforced epoxy (GRE). However, GRE has a maximum glass transition temperature in the range of from 250 to 350° F. When gaskets with GRE are exposed to temperatures above this range, the GRE becomes soft and rubber-like, and the GRE subsequently lacks the strength to properly support the sealing elements, thus leading to gasket failure. Additionally, GRE is typically adhered to a core of a gasket through the use of adhesive. This adhesive may fail at elevated temperatures and pressures, which can result in delamination.

Many gaskets incorporating materials having electrically isolating properties have larger thicknesses due to the material that is added to the core of the gasket in order to impart electrically isolating properties. Many common isolation materials have a dielectric strength value of between 400 and 800 volts/mil. Accordingly, a thick gasket is necessary to develop enough voltage resistance for common applications. These higher-thickness gaskets result in limitations on where the gaskets can be used.

Other problems associated with previously known gaskets having electrically isolating properties include structure complexity, limited dimensional stability, and limited chemical resistance. Thus, a need exists for an improved gasket having electrically isolating properties.

SUMMARY

Described herein are various embodiments of a gasket having electrically isolating properties. In some embodiments, the gasket includes a core gasket component having a coating or film of dielectric material provided on at least one surface of the core gasket component. In some embodiments, the coating or film comprises polyimide, ceramic, or aluminum oxide. In some embodiments, the coating or film is formed on all surfaces of the core gasket component, including on the surfaces of any grooves and/or protrusions formed in/on the axial surfaces of the core gasket component. A core gasket component fully encapsulated by the coating or film is also described herein.

BRIEF DESCRIPTION OF THE DRAWINGS

FIG. 3A is a top plan view of a gasket according to various embodiments described herein.

FIG. 3B is a cross-sectional view of the gasket of FIG. 3A along line A-A

FIG. 3C is a detail of a portion of the cross-section of FIG. 3.

DETAILED DESCRIPTION

Figure 1:
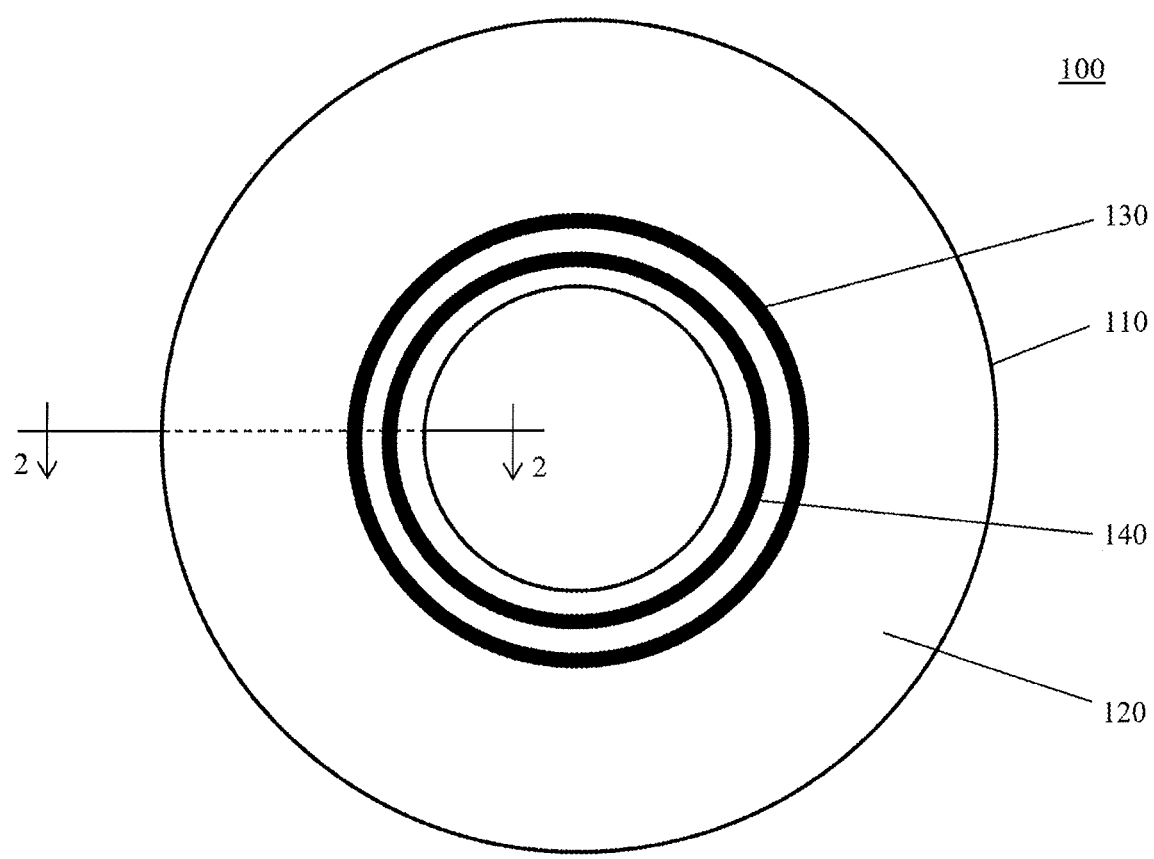
FIG. 1 is a top plan view of a gasket according to various embodiments described herein.

With reference to FIG. 1, a gasket 100 having improved electrically isolating properties according to various embodiments described herein is illustrated. The gasket 100 generally includes a core gasket component 110 (also referred to as a retainer) and a dielectric coating 120 formed on at least one surface of the core gasket component 110 (formed on at least the top axial surface of the core gasket component 110 as shown in FIG. 1). The dielectric coating 120 may be formed on both surfaces of the core gasket component 110. The core gasket component 110 may include one or more grooves formed in the axial surfaces of the core gasket component 110, with each groove having a sealing element 130, 140 disposed therein.

The core gasket component 110 can generally have a disc shape such that the gasket 100 is suitable for placement between, e.g., flanges of adjacent pipe segments. The dimensions of the core gasket component 110 (e.g., outer diameter, inner diameter, thickness between axial surfaces, etc.) are generally not limited and may be selected based on the specific application in which the gasket is to be used.

The material of the core gasket component 110 is generally not limited provided the core gasket component 110 is suitable for use in a gasket, including meeting or exceeding the properties required for the specific application in which the gasket 100 is used. The material of the core gasket component 110 will typically be an electrically conductive material because an object of the present application is to provide an electrically isolating coating to the core gasket component. In some embodiments, the material of the core gasket component 110 is a metal. In some embodiments, the material of the core gasket component 110 is stainless steel.

As noted above, the core gasket component 110 may include one or more grooves formed in one or more axial surface of the core gasket component 110. In some embodiments, the grooves are circular grooves aligned concentrically with the core gasket component 110, though other configurations can be used. In some embodiments, the grooves formed in one axial surface are identical to the grooves formed in the opposing axial surface, though other, non-symmetric configurations are also possible. In FIG. 1, the core gasket component 110 includes two concentrically aligned grooves formed in at least a top axial surface of the core gasket component 110, with each groove having a sealing element 130, 140 disposed therein.

While grooves are specifically mentioned above and throughout this document, the core gasket component 110 may include raised features in place of or in addition to grooves. Raised features can be used to, for example, lock a seal in place or serves as stress concentrators.

Figure 2A:
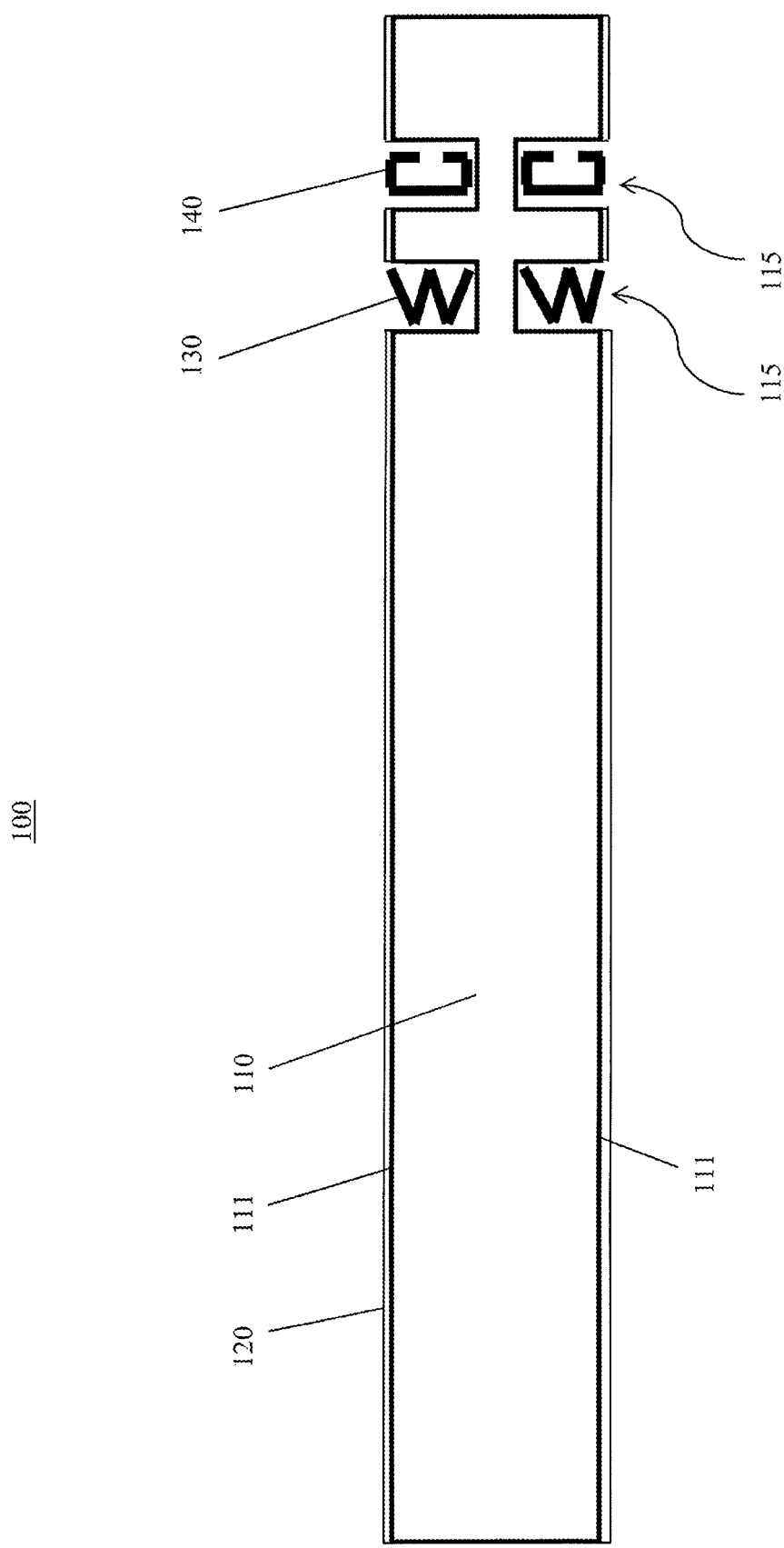
FIG. 2A is a cross-sectional view of the gasket shown in FIG. 1 taken along line 2-2.
Figure 2B:
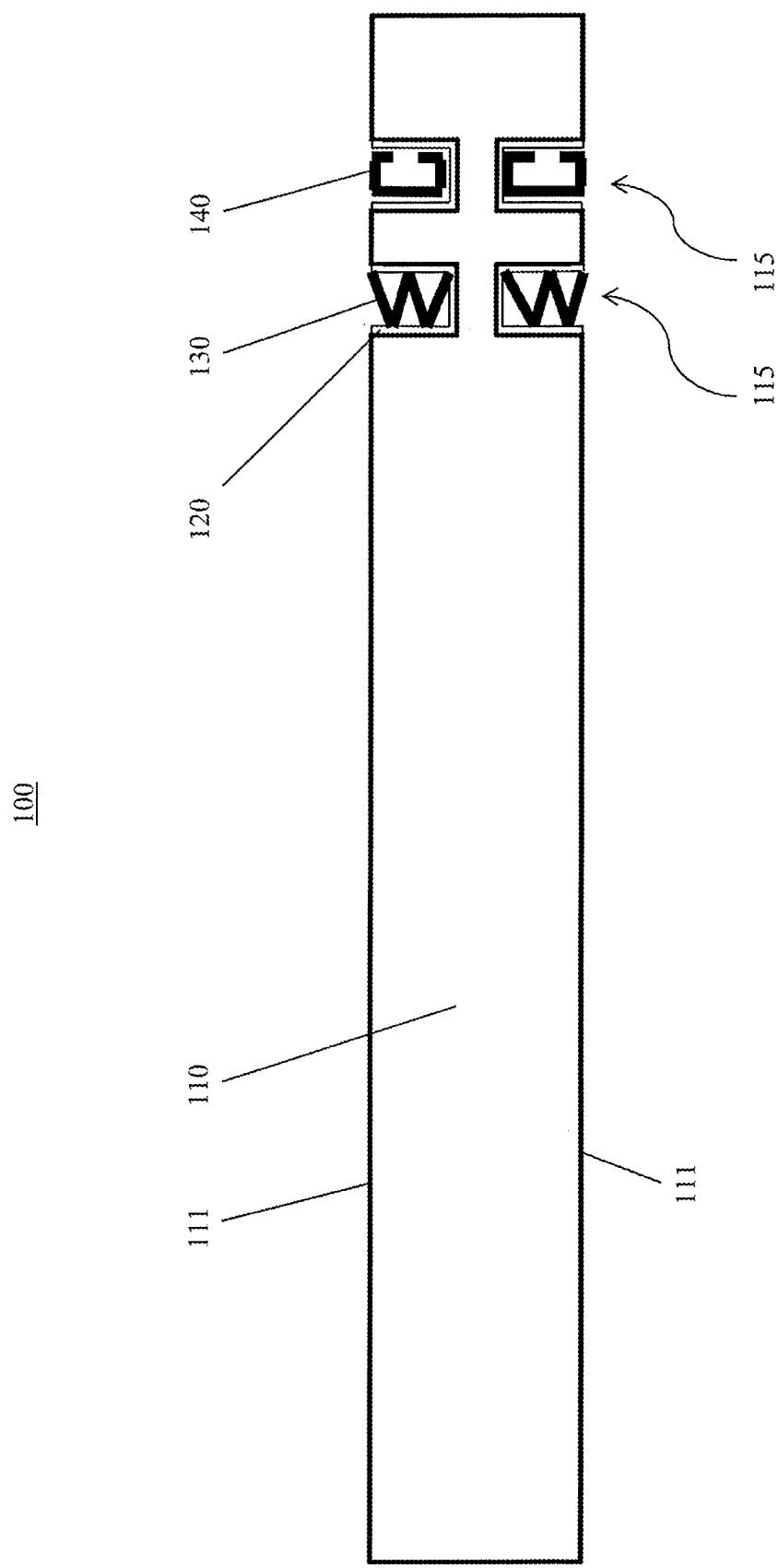
FIG. 2B is a cross-sectional view of a gasket according to various embodiments described herein.
Figure 2C:
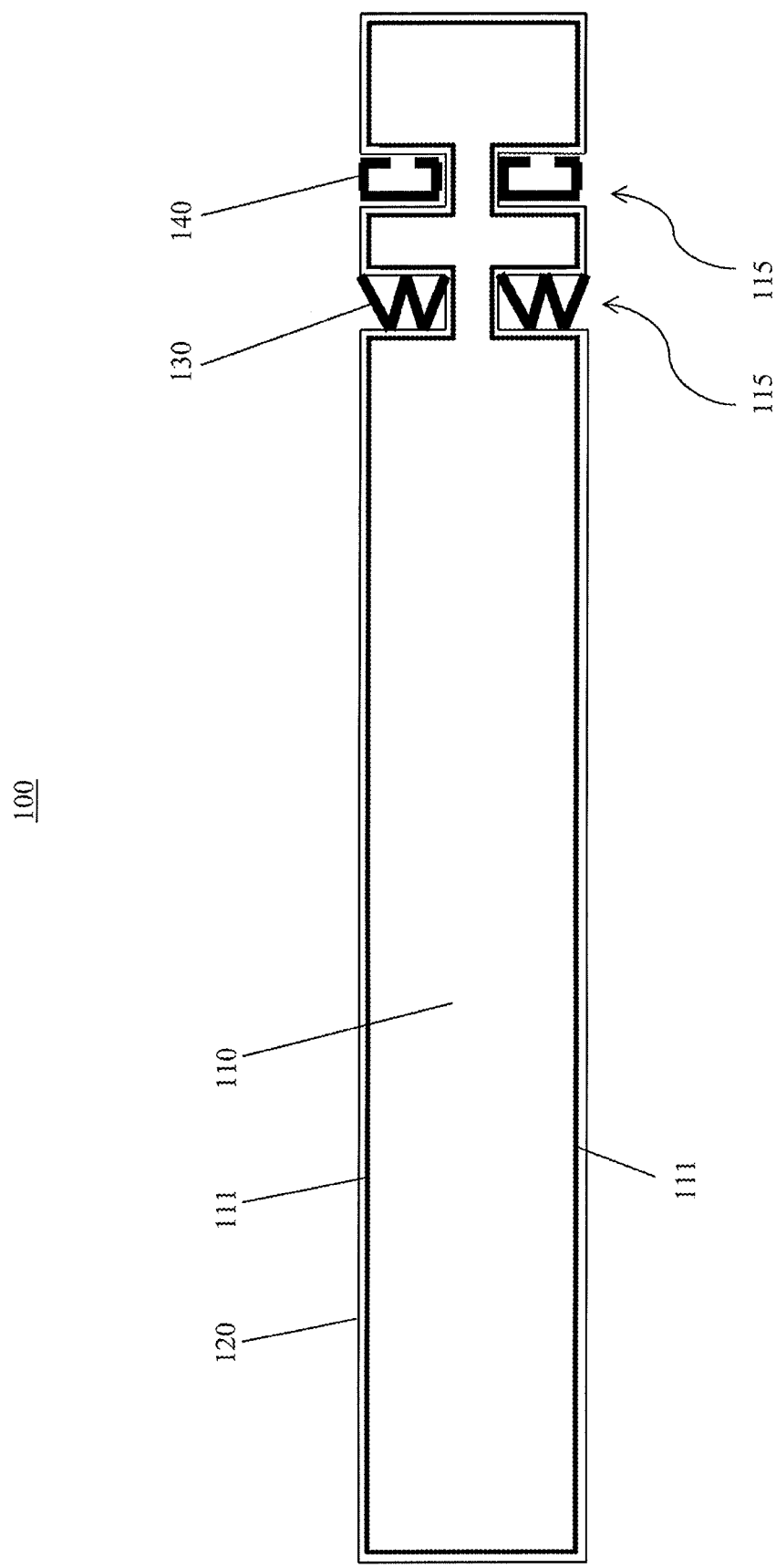
FIG. 2C is a cross-sectional view of a gasket according to various embodiments described herein.

With reference now to FIGS. 2A-2C, a cross-sectional view of the gasket 100 of FIG. 1 taken along line 2-2 is shown, with each of FIGS. 2A, 2B, and 2C showing a different embodiment of the gasket 100. In FIG. 2A, the dielectric coating 120 is formed on at least one surface of the core gasket component 110; in FIG. 2B, the dielectric coating 120 is formed on at least one surface of the grooves 115 formed in the core gasket component 110; and in FIG. 2C, the dielectric coating 120 is formed on all surfaces of the core gasket component 110, including the surfaces of the grooves 115.

While not shown in any of FIGS. 2A-2C, the core gasket component 110 may also include one or more features that protrude away from the axial surfaces 111 of the core gasket component 110. In embodiments where such features are included, the dielectric coating 120 may be disposed on one or more surfaces of the raised features.

The specific number of grooves 115 provided in the core gasket component 110 is not limited. Furthermore, the cross-sectional shape, depth, width, and placement (e.g., radial distance away from the inner diameter) of each groove is generally not limited. As shown in FIGS. 2A-2C, two grooves 115 are included in each axial surface 111, the grooves 115 have a generally square cross-sectional shape, the grooves 115 are located in close proximity to the inner diameter of the core gasket component 110, and the grooves 115 formed in one axial surface are identical in shape, depth, and location to the grooves 115 formed in the opposing axial surface.

In some embodiments, the grooves 115 formed in the core gasket component 110 are used as sealing grooves. These sealing grooves are configured such that one or more sealing elements can be disposed within the sealing grooves 115. Any type of sealing element can be disposed in the sealing grooves 115, including for example E-rings, C-rings, O-rings, and spiral wound-type seals. In some embodiments, and as shown in FIGS. 2A-2C, an E-ring 130 can be disposed in the radially outer groove 115 and a lip seal 140 can be disposed in the radially inner groove 115.

In some embodiments, the grooves 115 are shaped and dimensioned such that only a single sealing element fits within the groove. For example, the radially outer groove 115 can be shaped and dimensioned such that an E-ring disposed therein occupies the entirety of the groove 115 and leaves no additional space for other components, such as a compression limiter. The groove 115 can be shaped and dimensioned in this manner because in the embodiments described herein, the gasket retainer (i.e., core gasket component 110) itself may act as the compression limiter, thereby eliminating the need for a separate compression limiter component being incorporated into the gasket 100.

The gasket 100 further includes a dielectric coating 120. As noted above, the dielectric coating 120 is applied to at least one surface of the core gasket component 110, either partially (such as is shown in FIGS. 2A and 2B) or completely covering the surface (such as is shown in FIG. 2C) to which it is applied. As shown in FIG. 2C, in some embodiments, the dielectric coating 120 is applied completely to every surface of the core gasket component 110, including the surfaces of any grooves 115 (and/or raised features) formed in/on the core gasket component 110. In other words, the dielectric coating 120 can be formed on the core gasket component 110 so as to fully envelope the core gasket component 110. In this manner, this dielectric coating 120 can electrically isolate the metallic core gasket component 110 and increase the range of applications in which the gasket 100 can be used.

In some embodiments, the dielectric coating 120 formed on the one or more surfaces of the core gasket component 110 is formed with a uniform thickness, including when the dielectric coating 120 is provided on all surfaces of the core gasket component 110. The thickness of the dielectric coating is generally not limited. In some embodiments, the thickness of the dielectric coating is in the range of less than 6 mm. In some embodiments, the thickness of the coating is 0.381 mm or less, such as 0.127 mm or less.

In some embodiments, the thickness of the dielectric coating 120 may vary, such as in a scenario where the thickness of the coating on the groove surfaces (or on raised feature surfaces) is less than the thickness of the coating on other surfaces (axial or radial) of the core gasket component 110. Alternatively, the thickness of dielectric coating on groove and/or raised feature surfaces can be greater than on the other surfaces of the core gasket component 110. The thickness of the dielectric coating can also vary from groove to groove.

In some embodiments, the dielectric coating 120 is polyimide, polyamide, ceramic, or aluminum oxide, with polyimide being a preferred material.

In some embodiments, the gasket 100, including any coating material, is free of glass reinforced epoxy (GRE).

The coating 120 may be applied to the core gasket component 110 using any known technique for applying a coating to a base substrate. In some embodiments, the coating 120 is applied to the core gasket component 110 in a liquid form and then cured to form a solidified coating. In some embodiments, the curing is carried out in a continuous manner, which improves the throughput of the manufacturing process and makes the process more economically feasible. In some embodiments, the continuous curing process is carried out using a continuous infrared process or by continuously passing the core gasket component having liquid coating disposed therein through a convection oven. In some embodiments, the coating 120 is applied directly to the core gasket component 110 without the need for an intermediate adhesive or bonding layer.

The dielectric coating 120 being applied to all surfaces of the core gasket component 110 provides a gasket 100 that is electrically isolated from both any seals used with the gasket as well as from metallic flange surfaces that the gasket may be disposed between.

In some embodiments, the gasket described herein may further include an inner diameter seal, such as the inner diameter seal described in U.S. Published Application No. 2015/0276105, which application is incorporated herein by reference as if set out in full. Other inner diameter seals may also be used.

The gasket described herein may be thinner, seal better, improve electrical isolation, and/or provide a more robust and reliable platform for fire-safe gaskets than previously known gasket materials. The gasket material described herein also advantageously eliminates any need for glass reinforced epoxy (GRE) in the gasket material. The gasket material described herein also provides stabilized material thickness and tolerance controls. The gasket material described herein expands the operating temperatures and electrical resistance of the product and allows for entry into new spaces of development, such as steam and nuclear service. The gasket described herein also expands pressure capabilities.

The gasket described herein further provides high dielectric strength, permeation resistance, tight tolerance capabilities, impact resistance, strong environmental protection, improved chemical resistance, and a simplified structure (i.e., less components to the overall gasket).

Problems that may be solved and/or advantages that may be achieved by the gasket described herein include, but are not limited to: improving electrical isolation properties of the dielectric components of the gasket through the use of high dielectric material; reducing external corrosion through complete encapsulation of the gasket retainer; increasing temperature ranges, allowing for use in wider variety of applications where current offerings of isolating gaskets include GRE; eliminating observed problem of failure of adhesive between GRE and retainer material commonly seen at elevated temperatures and pressures; decreasing gasket thickness and thereby allowing for use in a wider variety of applications through the use of thinner dielectric materials, which allows for ease in installation; decreasing the number of gasket components and thereby reducing complexity by eliminating, e.g., a backup ring compression limiting device as what is currently seen in similar isolating gasket configuration; increasing dimensional stability through use of materials that have controlled tolerances; increasing the ability to hold tight tolerances throughout the manufacturing process; improving sealing performance through the elimination of permeation in current gasket facing material as well as providing a more dimensionally stable gasket sealing surface; reducing exposed metal and electrical conduction points by being fully encapsulated in a dielectric material; providing a variety of coatings that can be applied for gasket use in a wider variety of applications; providing the ability to vary coating thickness to accommodate different applications and flange faces; eliminating GRE from the gasket; providing coatings that allow for better sealing in the event of exposure to media that is not compatible with GRE; controlling gasket colorations to thereby allow for different colors to signify different coatings; allowing for use of varied metallic retainers; metallic retainer coated with dielectric barrier will continue to act as compression limiter in the event of fire preventing leakage due to loss of stress of the gasket or possible expansion and over compression of the seal; non-permeable coating mitigates explosive decompression in systems where drastic pressure changes can occur; and; ability to utilize conductive sealing elements such as explosive decompression resistant O-rings.

Advantageously, the spray coating of the dielectric material on the core gasket component has provided a thin profile for the resultant isolation gasket, which profile has a thickness or axial height of less than about 5 mm, and in some cases less than about 4.7 mm. Disadvantageously, however, gaskets having the thin profile make providing grooves for E-rings, C-rings, O-rings or the like difficult. FIGS. 3A-3C provide a gasket 200 that allows for a thin profile but provides an adequate primary seal and secondary seal without the necessity of grooves to hold additional seal elements and/or compression limiters.

FIG. 3A shows an elevation view of a gasket 200 with a gasket core 202 (or retainer 202). FIG. 3B shows a cross-sectional view of the gasket 200. FIG. 3C shows a detail of the cross-section of FIG. 3B. The gasket 200 has the gasket core 202, as mentioned above, and an inner seal element 204. The gasket 200 also has a C-ring 206 interspersed between the gasket core 202 and the inner seal element 204.

The inner seal element 204 is typically formed from a chemically inert material, as well as a non-conducting material. While not to be considered limiting, the inner seal element 204 may be formed from polytetrafluoroethylene (PTFE) or other fluoro polymers.

The gasket core 202 and C-ring 206 may be formed from a non-conductive material, but typically are formed of a base metal, such as, for example, stainless steel to name but one possible material. The gasket core 202 and C-ring 206 may be spray coated with the dielectric material coating 120 as described above. The dielectric coating 120 may be any of a number of materials. In some embodiments, the dielectric coating may be polyimide, polyamide, ceramic, aluminum oxide, fluoropolymers (such as, for example, PFA, PTFE, etc), and the like. It has been found that polyimide coatings work well for the technology disclosed herein. The dielectric coating 120 is may be applied as described above.

With reference to FIG. 3C, the gasket core 202 is shown having a first axial height of H1. The retaining ring 202 has an inner core surface 208 that has a first shape 210. The shape 210 in this exemplary embodiment is a concave shape, which will be explained further below. The inner core surface 208 defines an inner diameter D1 (FIG. 2B) of the gasket core 202.

The C-ring 206 correspondingly has an outer C-ring surface 212 that defines an outer diameter D2. The outer C-ring surface 212 is convex to cooperatively engage the inner core surface 208. Other shapes of the inner core surface 208 and outer C-ring surface 212 are possible. Also, while matching shapes in this exemplary embodiment, the shapes are not necessarily reciprocal as shown. For example, the C-ring 206 may be replaced by an E-ring or other convoluted shape seal. The inner core surface 208 would be designed to wrap around the convoluted outer surface of the seal.

The C-ring 206 comprises an opening 214, which is located opposite the outer C-ring surface 212. The opening 214 defines an inner diameter D3. The C-ring 206 has a pair of seal arms 216 extending from the outer C-ring surface 212 to the opening 214. The seal arms 216 have an apex 218. The apex 218, which is shown about midway along the seal arms 216, has an uncompressed height of H2, which is greater than the axial height H1. When the gasket 200 is compressed between flanged surfaces, the seal arms 216 at apex 218 form a seal interface with the flanged surfaces. Moreover, the opening 214 will decrease in size causing ends 220 of the seal arms 216 to approach each other.

The inner seal element 204, in this exemplary embodiment, is a pressure activated element where the inner seal element surface 222 provides a chevron shape. The inner seal element 204 has an uncompressed height of H3, which is greater than H2 Other pressure activated shapes are possible. Also, the inner seal element 204 could have a flat inner seal element surface in certain embodiments.

The inner seal element 204 also has an outer surface 224 that defines an outer diameter D4, which is substantially the same as the inner diameter D3. An engagement protrusion 226 (or annular ridge 226) extends from the outer surface 224 and extends into the opening 214. Rather than a single protrusion 226, the protrusion may comprise multiple legs. The protrusion 226 generally has a height that is less than the size of the uncompressed opening 214 such that the protrusion 226 freely fits within the opening 214. However, the protrusion 226 could be designed such that a snap fit or friction fit is established between the surfaces 228 of the protrusion 226 and the ends 220 of the C-ring 206. When compressed, the ends 220 of the C-ring 206 may grip the surfaces 228 of the protrusion 226 or, in some instances, pierce the surface 228 to form a positive lock with the C-ring 206.

The inner seal element 204 can be snapped into the C-ring 206 by pushing the inner seal element 204 until the protrusion 226 plasticly deforms. Once in place, the protrusion 226 would return to its original shape and extend into the opening 214. To facilitate insertion, the inner seal element 204 may be compressed radially to make the insertion easier. For example, the inner seal element 204 may be cooled to condense and shrink the diameter of the inner seal element 204. When returned to installation temperature (or operating temperature), the inner seal element 204 would expand as it warms to engage the C-ring 206.

The technology described herein is disclosed in the context of a gasket. However, the same principles can be applied to other types of pipe isolation components. For example, the features described herein, including coating a pipe isolation component partially or fully with a dielectric material such as a polyimide, could be applied to the flanges of a monolithic isolation joint, such as the ElectrosStop® Monolithic Isolation Joint manufactured by Garlock Pipeline Technologies, Inc. in Houston Tex.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. An electrically isolating gasket comprising:
   a metal core gasket component, the core gasket component having an inner surface defining a first inner diameter; and
   a ring seal component, the ring seal component have an outer surface shaped to cooperatively engage the inner surface of the core gasket component and an opening opposite the outer surface wherein the opening defines a second inner diameter that is less than the first inner diameter;
   a non-conductive inner seal component, the non-conductive inner seal component having an inner surface defining a third inner diameter that is less than the second inner diameter, the non-conductive inner seal component having an outer surface with a radially extending protrusion shaped to fit within the opening of the ring seal component such that the nonconductive inner seal component and the ring seal component are compression coupled; and
   a dielectric coating formed on at least the metal core gasket component.

2. The electrically isolating gasket of claim 1, wherein the metal is stainless steel.

3. The electrically isolating gasket of claim 1, wherein the ring seal component is made from metal and the dielectric coating is formed on the metal ring seal component.

4. The electrically isolating gasket of claim 3, wherein the metal is stainless steel.

5. The electrically isolating gasket of claim 1, wherein the non-conductive inner seal component is made from fluoropolymer.

6. The electrically isolating gasket of claim 5, wherein the fluoropolymer is polytetrafluoroethylene.

7. The electrically isolating gasket of claim 1, wherein the core gasket component has a first height and the ring seal has a second height greater than the first height.

8. The electrically isolating gasket of claim 7, wherein the non-conductive inner seal component has a third height greater than the second height.

9. The electrically isolating gasket of claim 8, wherein the dielectric coating material is polyimide.

10. The electrically isolating gasket of claim 9, wherein the coating has a uniform thickness.

11. The electrically isolating gasket of claim 10, wherein the thickness is less than 0.381 mm.

12. The electrically isolating gasket of claim 11, wherein the thickness is less than 0.127 mm.

13. The electrically isolating gasket of claim 1, wherein the inner surface of the non-conductive inner seal component forms a chevron shape.

14. A method of manufacturing an electrically isolating gasket comprising:
   coating every surface of a conductive core gasket component with a liquid coating of dielectric material and continuously curing the liquid coating to harden the liquid coating and secure the coating to the conductive core gasket component;
   coating every surface of a conductive ring seal component with a liquid coating of dielectric material and continuously curing the liquid coating to harden the liquid coating and secure the coating to the conductive ring seal component; and
   assembling an electrically isolating gasket by fitting the ring seal component within an inner diameter of the core gasket component and fitting a non-conductive inner seal component within an inner diameter of the ring seal component.

15. The method of manufacturing an electrically isolating gasket of claim 14, wherein continuously curing the liquid coating comprising continuously exposing the liquid coating to infrared radiation.

16. The method of claim 15, wherein fitting non-conductive inner seal component within an inner diameter of the ring seal component comprises cooling the non-conductive inner seal component to shrink a diameter of the non-conductive inner seal component.

17. An electrically isolating gasket comprising:
   a metal retainer having a concave inner surface; and
   a C-shaped seal component having a convex outer surface to cooperatively engage the concave inner surface, an opening opposite the convex outer surface, and a pair of seal arms extending from the convex outer surface to the opening such that the pair of seal arms have an apex between the outer surface and the opening;
   a non-conductive inner seal component having an outer surface with a radially extending protrusion shaped to fit within the opening of the C-shaped seal such that the non-conductive inner seal component and the ring seal component are operatively coupled; and
   a dielectric coating formed on at least one surface of the metal retainer.

18. The electrically isolating gasket of claim 17, wherein the non-conductive inner seal is chemically inert.

19. The electrically isolating gasket of claim 17, wherein the C-shaped component comprises a metal and the dielectric coating is spray coated on to the C-shaped seal component.

* * * * *